United States Patent

Miyoshi et al.

[11] Patent Number: 6,002,668
[45] Date of Patent: Dec. 14, 1999

[54] CELL OUTPUT CONTROL APPARATUS AND METHOD

[75] Inventors: Kota Miyoshi, Yokohama; Takahiko Kozaki, Tokyo; Hajime Abe, Yokohama; Akihiko Takase, Tokyo, all of Japan

[73] Assignee: Hitachi, Ltd., Tokyo, Japan

[21] Appl. No.: 08/810,733

[22] Filed: Mar. 4, 1997

[30] Foreign Application Priority Data

Mar. 8, 1996 [JP] Japan .................................. 8-051314

[51] Int. Cl.⁶ ........................... G06F 11/00; H04L 12/56; H04L 3/22
[52] U.S. Cl. ........................... 370/232; 370/412; 370/468
[58] Field of Search .................................... 370/230, 232, 370/233, 234, 236, 395, 397, 468, 253, 412

[56] References Cited

U.S. PATENT DOCUMENTS

| | | |
|---|---|---|
| 5,313,454 | 5/1994 | Bustini et al. . |
| 5,663,959 | 9/1997 | Nakagawa ............................... 370/395 |
| 5,694,554 | 12/1997 | Kawabata et al. ...................... 370/397 |
| 5,719,865 | 2/1998 | Sato ........................................ 370/395 |
| 5,745,477 | 4/1998 | Zheng et al. ........................... 370/230 |
| 5,748,614 | 5/1998 | Wallmeier .............................. 370/395 |
| 5,751,697 | 5/1998 | Radhakrishnan et al. ............. 370/234 |

FOREIGN PATENT DOCUMENTS

| | | |
|---|---|---|
| 4-260245 | 9/1992 | Japan . |
| 4-276943 | 10/1992 | Japan . |
| 8-125692 | 5/1996 | Japan . |
| 9-181740 | 7/1997 | Japan . |
| 9-247169 | 9/1997 | Japan . |

OTHER PUBLICATIONS

Cisco Systems "ATM Internetworking", by Anthony Alles, p. 121, Sep. 1995, (English Translation Attached).
"ATM Forum UNI version 3.1", PTR Prentice Hall Prentice–Hall, Inc., 1995.
IEEE Network, "RSVP: A New Resource ReSerVation Protocol", Lixia Zhang, et al., Sep. 1993.
"Multiprotocol Encapsulation Over ATM Adaptation Layer 5", Juha Heinanen, Request for Comments: 1483, Jul. 1993.
"ABR Flow Control", Traffic Management Specifications Version 4.0.
"The PPP Multilink Protocol (MP)", K. Sklower, et al., Aug. 1996.
Flow Labelled IP: A Connectionless Approach to ATM, by Peter Newman, et al pp. 1–10, Mar. 1996.

Primary Examiner—Chau Nguyen
Assistant Examiner—Phuongchau Ba Nguyen
Attorney, Agent, or Firm—Antonelli, Terry, Stout & Kraus, LLP

[57] ABSTRACT

The cell output control apparatus includes a cell time slot allotment circuit for allotting, cells to be transmitted, to cell time slots with the cell transmission intervals changed, a first holder circuit for holding the value of ACR (Allowed Cell Rate), a first calculator circuit for calculating the ratio, LCR (Line Cell Rate)/ACR, a quantizer circuit for quantizing the ratio, LCR/ACR and controlling the allotment of cell time slots on the basis of the quantization error produced by the quantization, a counter for counting the values of cell time slots, a second calculator circuit for calculating the cell time slots for cells, and a second holder circuit for holding the calculated results, whereby it is possible to absorb the quantization error produced when the ratio, LCR/ACR is quantized into an integral value.

11 Claims, 9 Drawing Sheets

| NUMBER OF QUANTIZATION OPERATIONS | ABR OUTPUT RATE 18-4 | PREVIOUS QUANTIZATION ERROR 18-5-14 | RESULT FROM ABSORBER | | CALCULATED QUANTIZATION ERROR 18-5-12 | QUANTIZED VALUE 18-6 |
|---|---|---|---|---|---|---|
| | | | 18-5-2 | 18-5-3 | | |
| 1 | 1.2 | 0 | 1 | 0.2 | 0.8 | 2 |
| 2 | 1.2 | 0.8 | 0 | 0.4 | 0.6 | 1 |
| 3 | 1.2 | 0.6 | 0 | 0.6 | 0.4 | 1 |
| 4 | 1.2 | 0.4 | 0 | 0.8 | 0.2 | 1 |
| 5 | 1.2 | 0.2 | 0 | 1.0 | 0 | 1 |

CELL OUTPUT CONTROL APPARATUS AND METHOD

BACKGROUND OF THE INVENTION

The present invention relates to a cell output control apparatus and method in communication systems using asynchronous transfer mode, and particularly to a cell output control circuit apparatus and method suitable for use in communication systems which provide available bit rate services.

The U.S. Pat. No. 5,313,454 has disclosed a conversion system having an available bit rate (herein-after, abbreviated ABR) traffic class incorporated in order to make feed-back control for preventing the congestion in a communications network in which cells of asynchronous transfer mode (hereinafter, abbreviated ATM) are processed. Here, the ABR traffic class is for transmitting and receiving ATM cells from a source (transmitting terminal, or a transmitting node) at an allowed cell rate (hereinafter, abbreviated ACR) in an ATM communications network. This system sets up such an ACR that when a resource management cell (hereinafter, abbreviated RM cell) including the congestion information of the network is inserted in the cell flow that is transmitted and received within the network, and transferred back to the source from the destination (receiving terminal, or receiving node), the source changes the ACR in accordance with the information of the received RM cell so that the congestion within the network can be decreased as much as possible and that the cells can be transmitted at a large transfer rate.

When the cells are transmitted from the source at the ACR, the ATM-communication system decides whether a cell is allowed to transmit at each ATM cell time slot or not in order to transmit at the ACR. In general, after a cell is transmitted on a certain cell time slot, the next cell time slot to be produced is calculated, and the cell is timely transmitted on that slot. More specifically, when the line cell rate (hereinafter, abbreviated LCR) and the ACR are 150 Mb/s and 50 Mb/s, respectively, a cell can be transmitted at each three time slots. Therefore, after a cell is transmitted on a certain time slot, the next time slot is produced three cell time slots later. In other words, when a cell is transmitted on a certain cell time slot, the next cell time slot is produced LCR/ACR cell time slots later.

SUMMARY OF THE INVENTION

It is an object of the invention to provide a cell output control method and apparatus capable of absorbing quantization error produced when the ratio LCR/ACR is quantized into an integral value in order that cells are allotted to cell time slots and transmitted on the slots.

It is another object of the invention to provide a cell output control method and apparatus capable of transmitting cells with the quantization error surely absorbed by a simple construction and of easily adapting to even fast transfer rates in order that the communication systems can provide ABR services with ease.

According to the invention, the output control apparatus used in the communication systems includes a cell time slot allotment circuit for allotting cells to cell time slots with the cell transmission intervals changed by the feedback of the quantization error so that the cells can be transmitted at a rate near ACR.

This cell time slot allotment circuit includes a first holder circuit for holding the ACR calculated in the communication systems according to the traffic state of the network, a first calculator circuit for calculating a rate at which cells are transmitted, on the basis of the ACR and LCR, a quantizer circuit for quantizing the calculated results and controlling the cell time slot allotment on the basis of the quantization error produced by the quantization, a counter for counting the number of the cell time slots, or the cell time slot value, a second calculator circuit for calculating the rate at which cells are transmitted on the cell time slots on the basis of the quantized value and the count, and a second holder circuit for holding the calculated results.

The first calculator circuit has a table and a bit shift circuit. The table has rates previously set up at which cells are transmitted, in order that the cell output rates can be obtained by only bit-shifting the output produced from the table when the ACR value is inputted to the table, or that there is no need to use complicated arithmetic circuits.

The quantizer circuit includes a decision circuit for deciding the intervals of the cell time slots on which cells are transmitted, on the basis of the quantized value and the quantization error, and a calculator circuit and quantization error holder circuit for producing the remainder of the quantization error and feeding it back to the decision circuit after the cell output intervals are decided.

Therefore, the cell output control method and apparatus including these circuits controls the allotment of cells to cell time slots so that each time a cell is allotted to a cell time slot and transmitted on the slot, the ACR calculation, cell time slot interval decision and quantization error calculation are repeated to reduce the quantization error to zero, or that cells are allotted to cell time slots with the cell transmission interval changed and are transmitted at a rate near ACR.

The above construction makes it possible to allot cells so that the cells can be transmitted at a rate near ACR, by holding the difference between the calculated value and the cell time slots per unit time and using it for the next calculation when the quantization computation is made for cell time slots on the basis of the rate (ACR) allotted to the ABR traffic class. Then, the cell time slots for cell transmission can be calculated from the ACR. In addition, when the ratio of ACR to LCR is quantized for cell time slots, the produced quantization error can be absorbed. Particularly when ACR is near LCR, the quantization error is absorbed by allotting cells to any ones of a plurality of cell time slots with the cell transmission interval changed, thus making it possible to transmit cells at a rate near ACR.

DESCRIPTION OF THE PREFERRED EMBODIMENTS

Embodiments of the cell output control apparatus and method of the invention will be described in detail with reference to the accompanying drawings.

Figure 1:
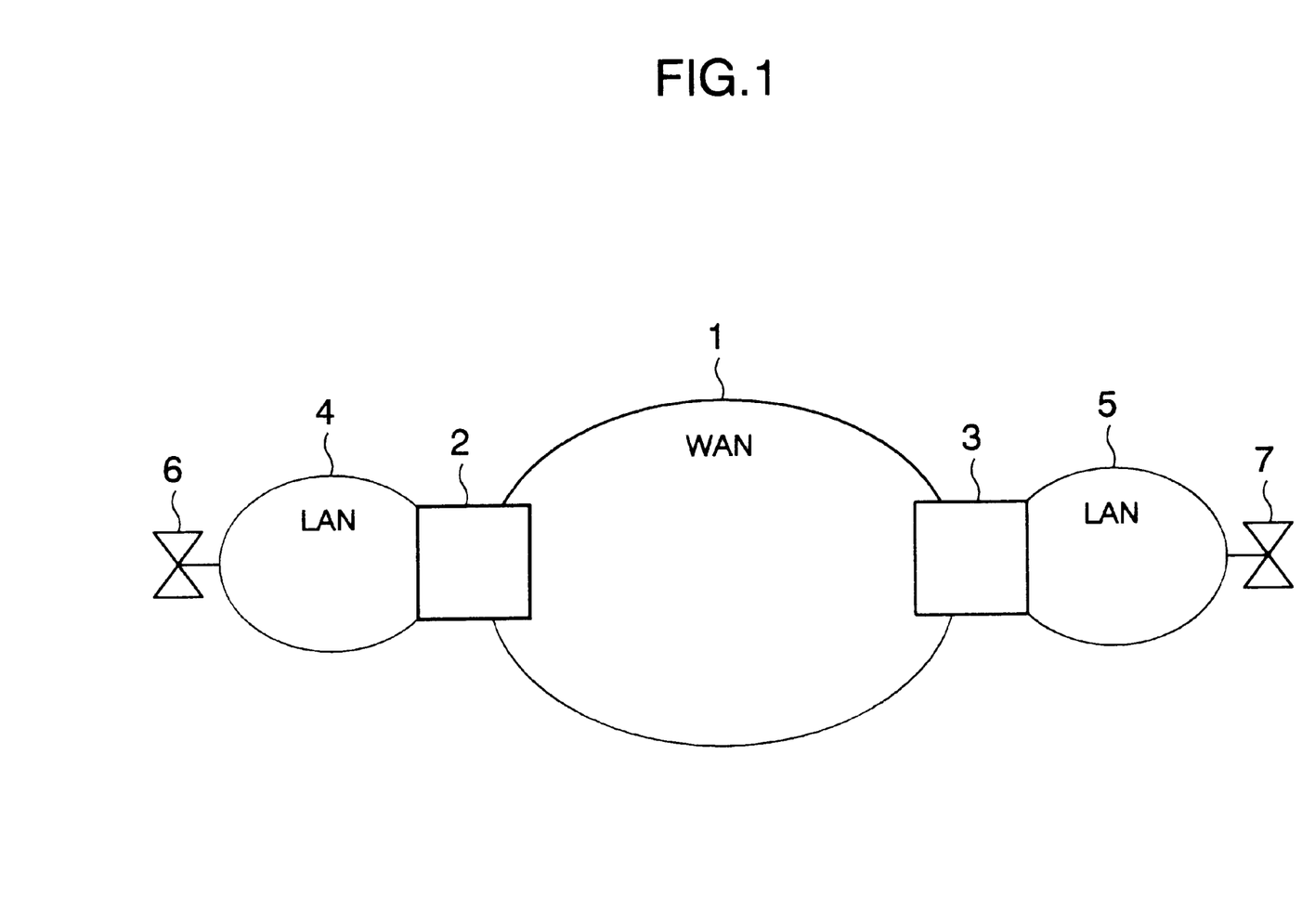
FIG. 1 is a block diagram of communications networks using the cell output control apparatus of the invention.

FIG. 1 is a schematic diagram of communications networks including packet switching systems in which the cell output control apparatus of the invention is used. In the communications networks, the packet switching systems 2 and 3 are provided between a wide area network (WAN) 1 and local area networks (LAN) 4 and 5, respectively, so that ABR traffic class services can be provided between a terminal 6 and the packet switching system 2, between the packet switching systems 2 and 3, and between the packet switching system 3 and a terminal 7. The communications networks can also provide constant bit rate (hereinafter, abbreviated CBR) services and variable bit rate (hereinafter, abbreviated VBR) services at the same time.

Figure 2:
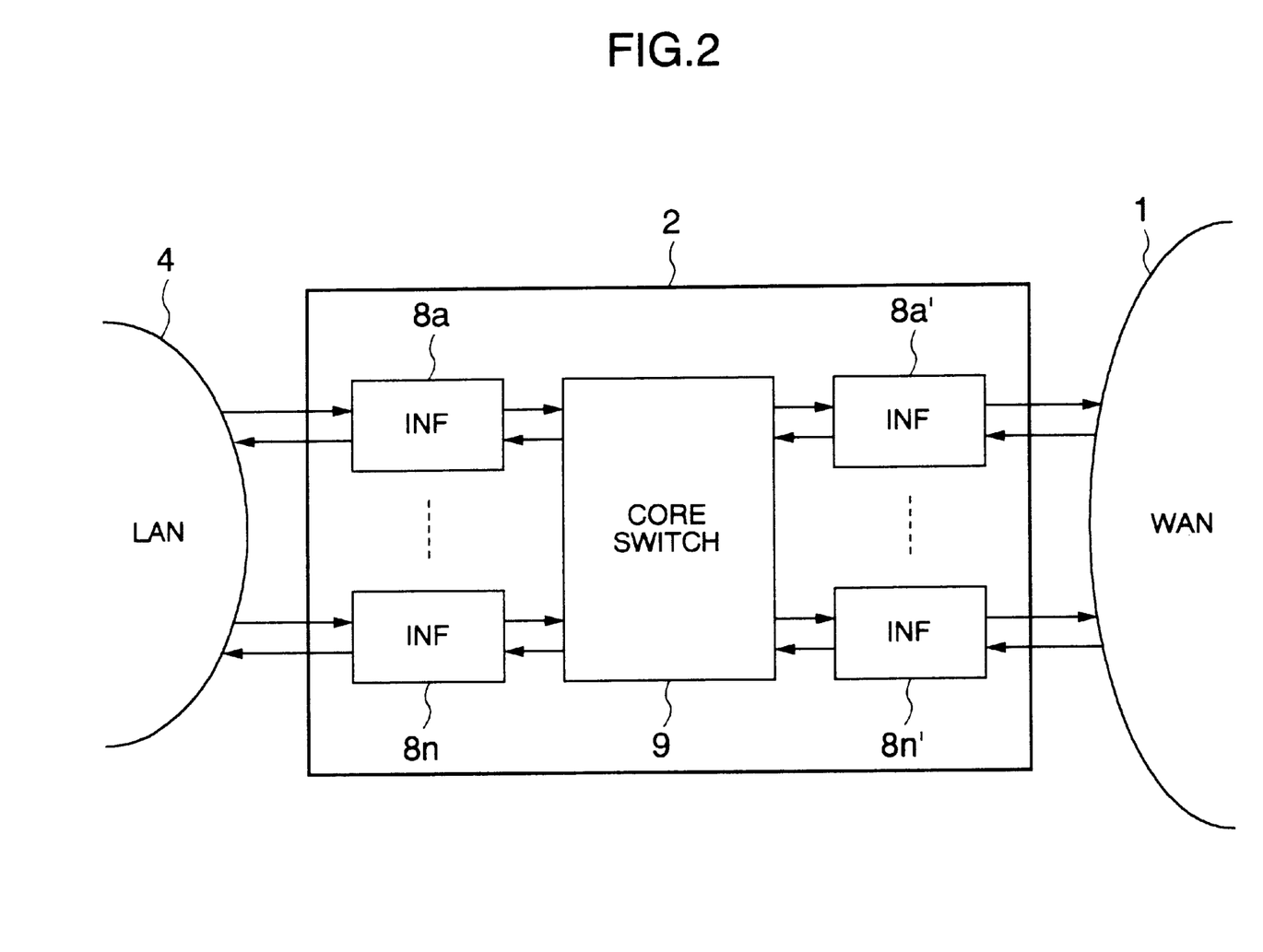
FIG. 2 is a block diagram of a communication system using the cell output control apparatus of the invention.

FIG. 2 is a schematic block diagram of the packet switching system as a communication system in which the cell output control apparatus of the invention is used. The packet switching system 2 includes a core switch 9, interfaces INF 8a to 8n on the LAN 4 side, and interfaces INF 8a' to 8n' on the WAN 1 side. An ABR control, as described below, is made between the terminal 6 and the interfaces INFs 8a to 8n, and between the other packet switching system 3 connected to the WAN 1 and the interfaces INF 8a' to 8n'. Since the ABR control is performed mutually between the transmitting node (source) and the receiving node (destination), each interface INF 8a to 8n, 8a' to 8n' has both functions for the source and destination, and has provided therein a plurality of virtual channels (hereinafter, abbreviated VC) for a plurality of service classes and for a plurality of ATMs.

Figure 3:
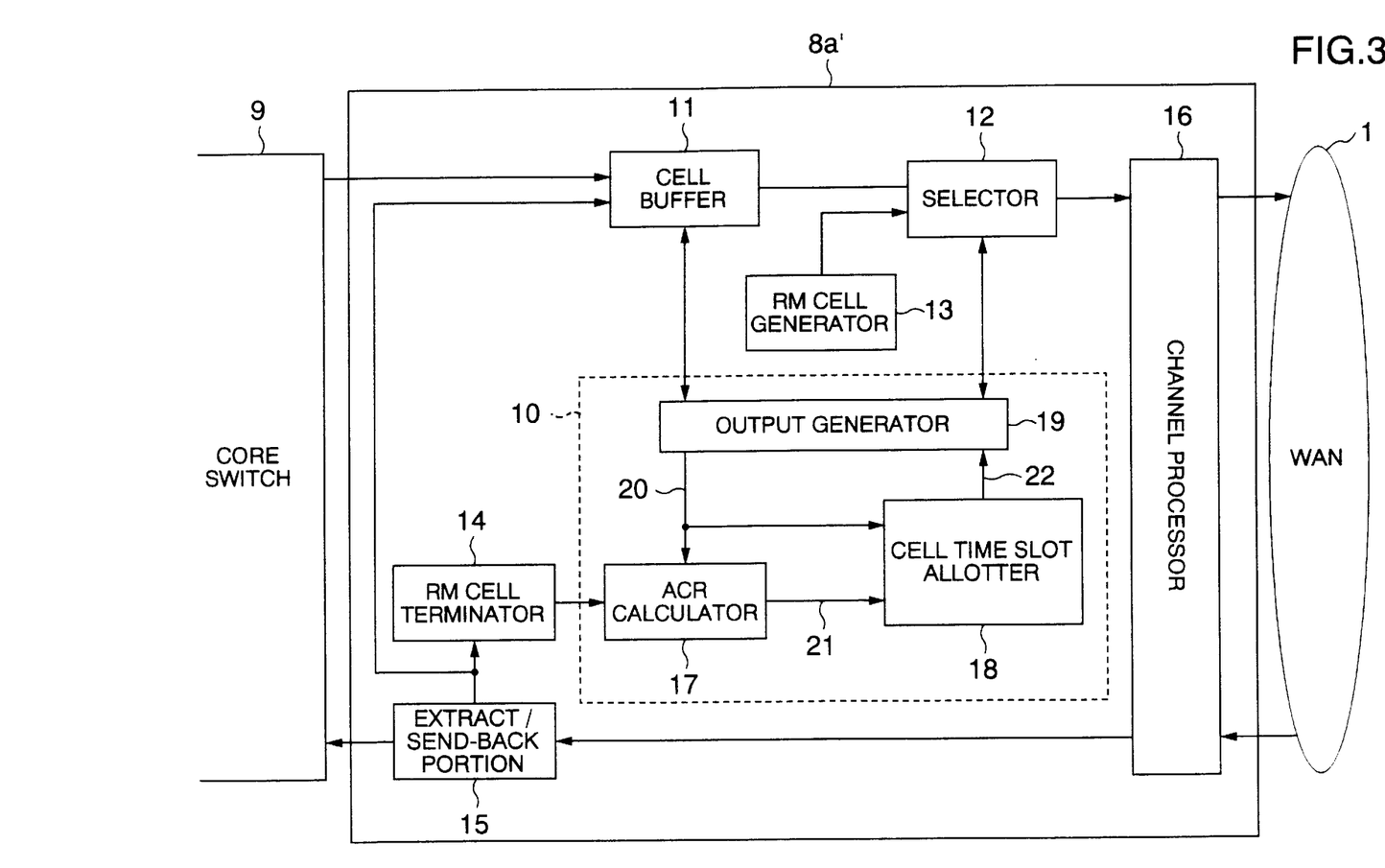
FIG. 3 is a block diagram of an interface of the communication system using the cell output control apparatus of the invention.

FIG. 3 is a block diagram showing the construction of the interface (the interface INF 8a to 8n, 8a' to 8n' in the packet switching system illustrated in FIG. 2) that has the cell output control apparatus of the invention. With reference to FIG. 3, a description will be made of the source/destination functions and construction for the ABR services.

If the source and destination are INF 8a and INF 8a', respectively, the INF 8a has the source function to (1) generate RM cells, (2) terminate the RM cells fed back from the INF 8a' (the destination which will be describe later) of the opposite packet switching system 3 and confirm the congestion indication, (3) calculate the ACR according to the congestion indication, and (4) produce cells in accordance with the calculated ACR from a cell buffer 11. The generation of RM cells in (1) is performed by an RM cell generator 13, and the output from the generator is managed by an output manager 19 within a scheduler 10. The termination of RM cells and the confirmation of congestion indication in (2) are made at an RM cell terminator 14. Specifically, the source detects a congestion indication bit (hereinafter, abbreviated CI bit) of the fed-back RM cell, and transfers it to the scheduler 10. The calculation of ACR in (3) and the cell output in (4) are carried out by the scheduler 10. That is, an ACR calculator 17 reduces the ACR when the CI bit from the RM cell terminator 14 indicates the presence of congestion (CI=1), but increases the ACR when it indicates the absence. A cell time slot allotter 18 calculates the ratio LCR/ACR on the basis of the calculated ACR, or makes the so-called quantization on it so that the cells can be allotted to cell time slots and transmitted, on the basis of the quantized values. The output manager 19 manages to receive an output 22 indicating the output of quantized values from the cell time slot allotter 18, allot various cells (cells of ABR (including RM cells), CBR, VBR) to cell time slots on the basis of the output 22, and supply the cells through a channel processor 16 to the network (WAN) 1.

On the other hand, the destination function is to (1) transmit the RM cell from the INF 8a (the source previously mentioned) of the opposite packet switching system 2 back to the INF 8a and (2) add the congestion indication bit to the RM cell at the time of the back transmission. These operations are made by an RM cell extract/send-back portion 15. Specifically, when the RM cell transmitted from the opposite source arrives at the destination, the CI bit of the RM cell is turned "1" or "0" according to whether the congestion indication bit of the preceding data cell just before the arrived RM cell, or the explicit forward congestion indication (hereinafter, abbreviated EFCI) bit to the following apparatus is "1", indicating congestion, as is specified in an ATM Forum, and then the RM cell is transmitted back to the source. In this case, the RM cell to be transferred is once stored in the cell buffer 11, and read therefrom under the control of the output manager 19.

Figure 4:
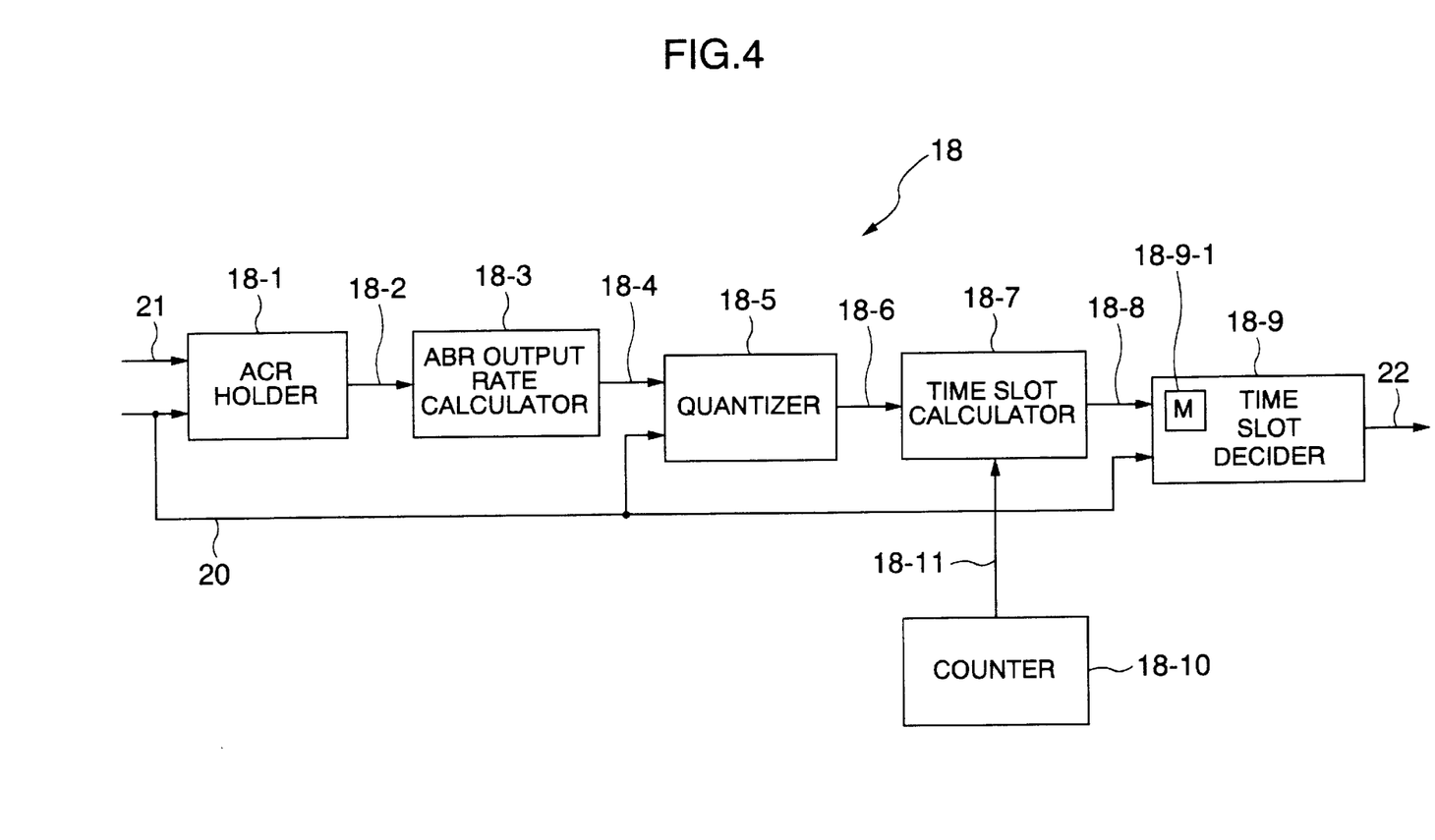
FIG. 4 is a block diagram of a cell time slot allotment circuit.

FIG. 4 shows an embodiment of the cell output control apparatus of the invention, or is a block diagram of the construction of the cell time slot allotter 18 included in the scheduler 10 of each INF 8a . . . 8n, INF 8a' . . . 8n' of the packet switching system 2, 3.

The cell time slot allotter 18 for realizing the output control apparatus of the invention includes an ACR holder circuit 18-1 for once holding an ACR 21 from the ACR calculator 17, a cell output rate calculator circuit 18-3 for calculating the cell output rate on the basis of the ACR 18-2 from the ACR holder circuit 18-1 and the LCR (for example, 155,52 Mbps, transfer rate of STM-1, provided in the recommendation of the International Telecommunication Union ITU-T), a quantizer circuit 18-5 for quantizing the output, 18-4 from the cell output rate calculator circuit 18-3, and controlling the allotment of cell time slots, an output time slot calculator 18-7 for adding the output, 18-6 from the quantizer circuit 18-5 and the current cell time slot 18-11 from a cell time slot counter 18-10 (which counts the cell time slot value) to produce a time slot 18-8 for a cell, and a cell output time slot deciding circuit 18-9 for once storing the result, 18-8 from the output time slot calculator 18-7 in its storage circuit 18-9-1 and supplying it to the output manager 22. This cell time slot allotter 18 controls the interval (the allotment of cell time slots to the cells to be transmitted) of the cells produced in accordance with the traffic state of the network and thereby generates the cells at the rate near the ACR suited for ABR class services in which the transfer rate of cells is changed during communication.

The construction and operation of this apparatus will be described in detail with reference to FIGS. 3 and 4.

First, the ACR holder circuit 18-1 will be mentioned below.

The ACR calculator 17 of the scheduler 10 at, for example, interface INF 8a receives the RM cell, and adds or subtracts the ACR according to the CI bit of the RM cell. On the other hand, the cell time slot allotter 18 calculates the output cell time slot for the next cell to be generated when the previous cell is produced from the cell buffer 11. In other words, the ACR calculated at the time of receiving RM cell is required to hold until the output cell time slot is calculated up. The ACR holder circuit 18-1 is used for this purpose. As described previously, the ACR holder circuit 18-1 has storage regions the number of which corresponds to that of a plurality of VCs because ACR values are stored on the VCs, and produces the ACR on each VCR when the cell output rate is computed as will be described later.

The cell output rate calculator circuit 18-3 will be described. This cell output rate calculator circuit 18-3 calculates the output rate of the ABR cell relative to ACR, (LCR/ACR) necessary to compute the next cell output time slot when the previous cell is produced from the cell buffer 11. This circuit will be described with reference to FIGS. 5 and 6.

Figure 5:
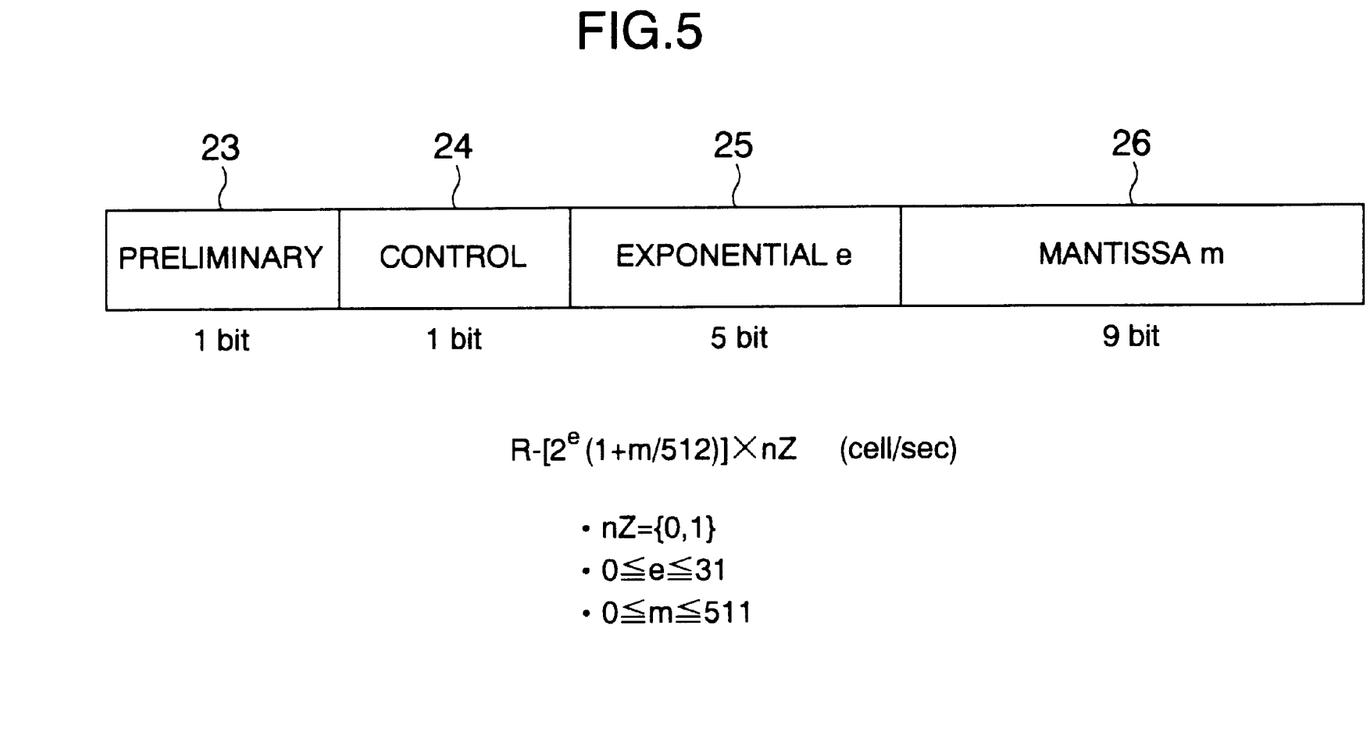
FIG. 5 is a frame structure diagram showing the format of a cell transmission rate signal.
Figure 6:
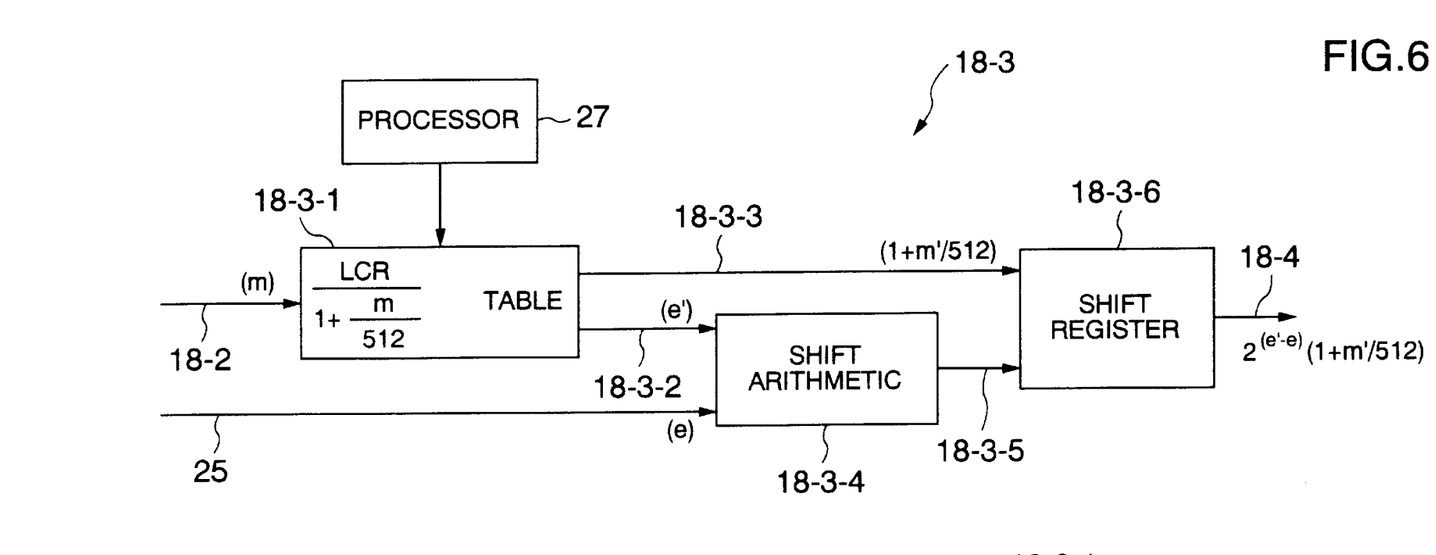
FIG. 6 is a block diagram an ABR signal output rate arithmetic circuit.

FIG. 5 is a frame diagram showing the format of the cell transmission rate signal, and FIG. 6 is a block diagram of the cell output rate calculator circuit 18-3 of this invention.

The format of the signal to be used for the calculation will be first mentioned with reference to FIG. 5. The format of the cell transfer rate signal, as established in the ATM-Forum, has a preliminary bit 23, a control bit nZ 24 (1 bit) for indicating rate R=0, an exponential part e 25 of 5 bits for indicating the rate, and a mantissa part m 26 of 9 bits, or a total of 16 bits. The rate R is given by the following equation:

$$R=[2^{**}e \times (1+m/512)] \times nZ (\text{cells}/s) \quad (1)$$

(2**e indicates the e-the power of 2)

The maximum value of the above equation is 231×2= about 4×109 (cells/s), and thus the possible range of the rate is up to several (Tb's/s).

The two rates LCR and ACR used for the calculation in the cell output rate calculator circuit 18-3 of the invention are expressed, according to the above format, as below:

$$LCR=[2^{**}e' \times (1+m'/512)] \times nZ$$

$$ACR=[2^{**}e \times (1+m/512)] \times nZ$$

A description will be made of the case in which nZ=1, or R is not zero in the construction and operation of the cell output rate calculator circuit 18-3.

The ratio LCR/ACR is expanded into the following equation from Eq. (1):

$$LCR/ACR=(LCR/2^{}e) \times \{1/(1+m/512)\}=(1/2^{}e) \times \{LCR/(1+m/512)\} \quad (2)$$

Figure 7:
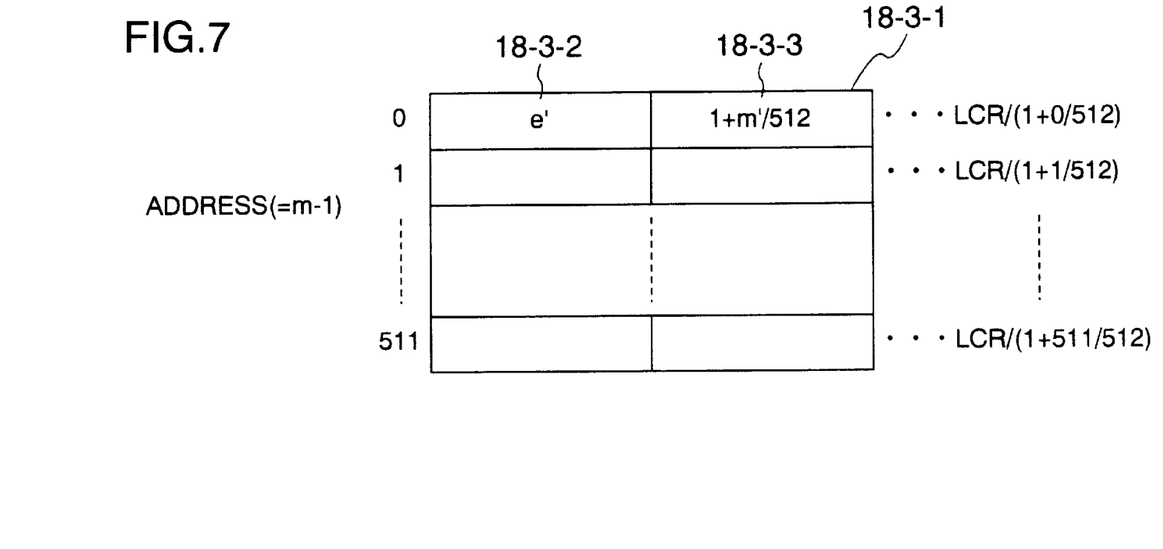
FIG. 7 is a table diagram showing the structure of a table used in the cell output control apparatus.

The cell output rate calculator circuit 18-3 of the invention has a table 18-3-1 in which the value of LCR/(1+m/512) in Eq. (2) is previously written from an external processor 27 as shown in FIG. 6. FIG. 7 is a table structure diagram showing the structure of the table 18-3-1. When the mantissa part m 26 of the ACR 18-2 is fed from the ACR holder circuit 18-1 as the address to the table 18-3-1, the table produces the exponential part e+ 18-3-2 of LCR and (1+m'/512) 18-3-3 including mantissa part m' from the address as the result of calculating LCR/(1+m/512). This table 18-3-1 is useful to construct a complicated multiplying or dividing circuit with ease as explained below.

That is, the LCR/ACR of Eq. (2) can be expressed as $$LCR/ACR=\{2^{**}(e'-e)\}(1+m'/512) \quad (3)$$

The right side of the equation (3) corresponds to (e−e') bits shifting of the output (1+m'/512) 18-3-3 from the table 18-3-1. Thus, the cell output rate can be simply calculated by only shifting the output (1+m'/512) 18-3-2 from the table 18-3-1 by the (e−e') bits 18-3-5 that was calculated by a shift bit calculator circuit 18-3-4. The result of the calculation, 18-4 is supplied to the quantizer circuit 18-5.

Figure 8:
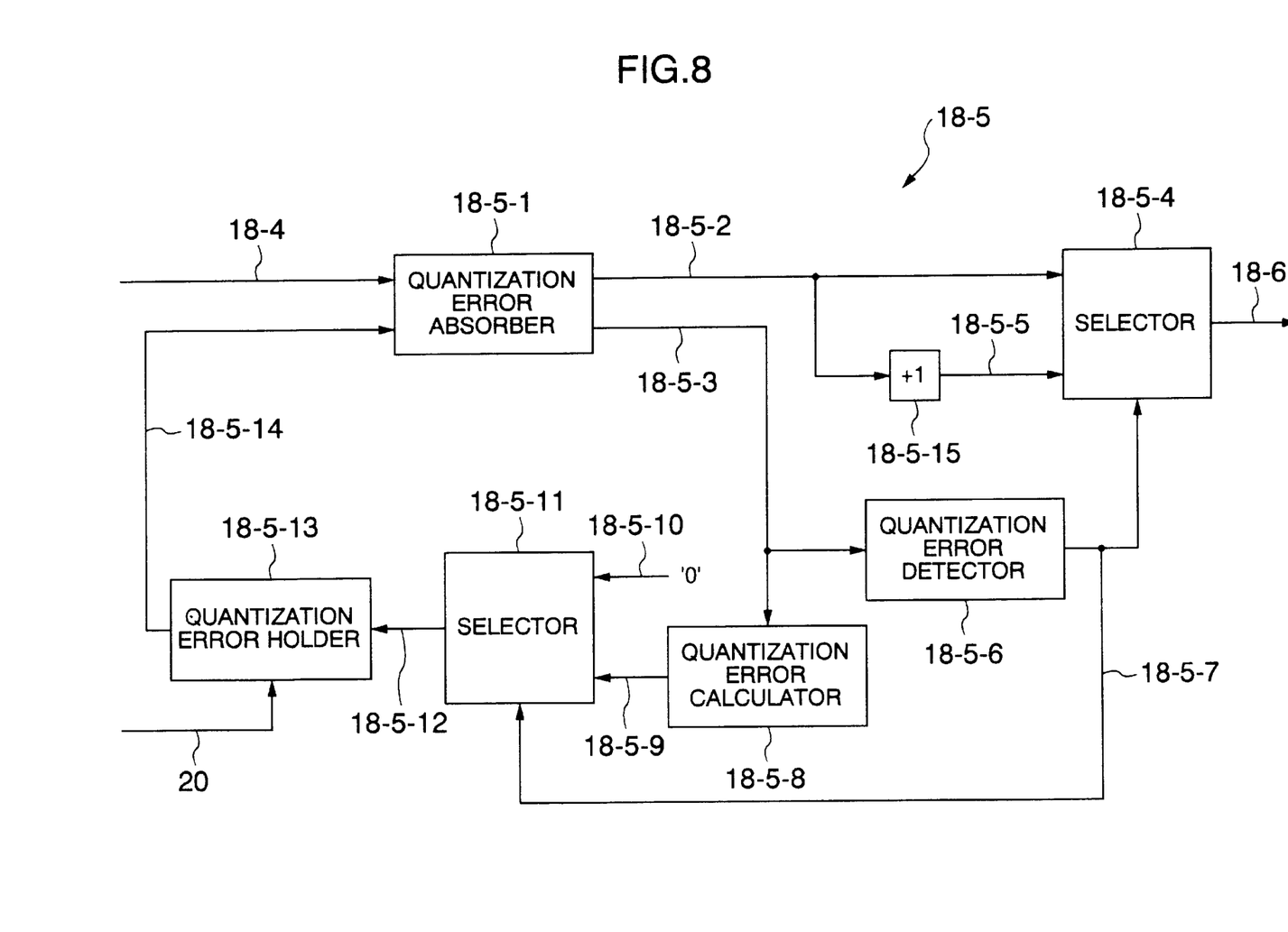
FIG. 8 is a block diagram of a quantizer circuit.

The construction and operation of the quantizer circuit 18-5 will be mentioned below.

FIG. 8 is a block diagram of the quantizer circuit of this invention.

This quantizer circuit 18-5 quantizes the cell output rate 18-4 so that cells can be allotted to cell time slots. First, in a quantization error absorber circuit 18-5-1, a quantization error value 18-5-14 (the initial value is zero) held in a quantization error holder circuit 18-5-13 at the time of the previous output control is subtracted from the input cell output rate value 18-4. Here, the quantization error holder circuit 18-5-13 holds error on each one of a plurality of VC. It produces a value from a region corresponding to a VC value 20 that is fed at the same time as the output rate 18-4, and supplies it to the absorber circuit where substraction is made. The result of the subtraction in the quantization error absorber circuit 18-5-1 is divided into an integral part bit 18-5-2 corresponding to the cell output (allotment) interval and a decimal part bit 18-5-3 corresponding to the quantization error. The decimal part bit 18-5-3 is supplied to a quantization error detector circuit 18-5-6 and a quantization error calculator circuit 18-5-8.

The quantization error detector circuit 18-5-6 detects the presence or absence of a decimal (quantization error) from the output (decimal part bit) 18-5-3 which the quantization error absorber circuit 18-5-1 produced. The quantization error calculator circuit 18-5-8 calculates a quantization error 18-5-9 (1-decimal part 18-5-3).

If the quantization error detector circuit 18-5-6 decides that there is no decimal (no quantization error), a selector 18-5-4 selects the integral part bit 18-5-2 as one of the inputs and produces a cell output rate quantized value 18-6 as the output from the quantizer circuit 18-5. At the same time, a selector 18-5-10 selects "0", and supplies it to the quantization error holder circuit 18-5-13 where "0" is stored as the previously calculated quantization error.

If the quantization error detector circuit 8-5-6 decides that the decimal is present (the quantization error remains), the selector 18-5-4 selects the sum 18-5-5 of the integral part bit 18-5-2 and "1" and produces it as the cell output quantized value 18-6 from the quantizer circuit 18-5. At the same time, the selector 18-5-10 selects a quantization error 18-5-9 from the quantization error calculator 18-5-8, and supplies it to the quantization error holder circuit 18-5-13 where the quantization error at the previous calculation time is stored. This value is produced as the quantization error 18-5-14 for the next quantization, and the quantization error absorber circuit 18-5-1 again makes the process.

The output time slot calculator circuit 18-7 will be mentioned below.

In the output time slot calculator circuit 18-7, the cell output rate 18-6 from the quantizer circuit 18-5 is added to the current cell time slot value 18-11 from the cell time slot counter 18-10. The output from the output time slot calculator circuit 18-7 is supplied to the output time slot storage circuit 18-9-1 as the cell time slot 18-8 for the next cell. More specifically, the cell time slot counter 18-10 counts the cell time slot value from, for example, the INF 8*a*. If the current cell time slot and the cell output rate 18-6 from the quantizer circuit 18-5 are respectively "5" and "2", the time slot for the next cell is produced when the cell time slot counter counts "7".

The storage circuit 18-9-1 in the cell output time slot holder circuit 18-9 holds on each of a plurality of VCs the output cell time slot 18-8 fed from the output time slot calculator 18-7. The stored output time slots are used when the output manager 19 of the scheduler 10 makes cell output decision, and cells are allotted to the cell time slots so that the cells can be transmitted at a rate close to the ACR.

After the cell output, the next cell output time slot is calculated by the above construction and procedure.

The operation of the cell output control apparatus of the invention in the case of LCR/ACR=1.2 will be further described with reference to drawings.

Figure 9:
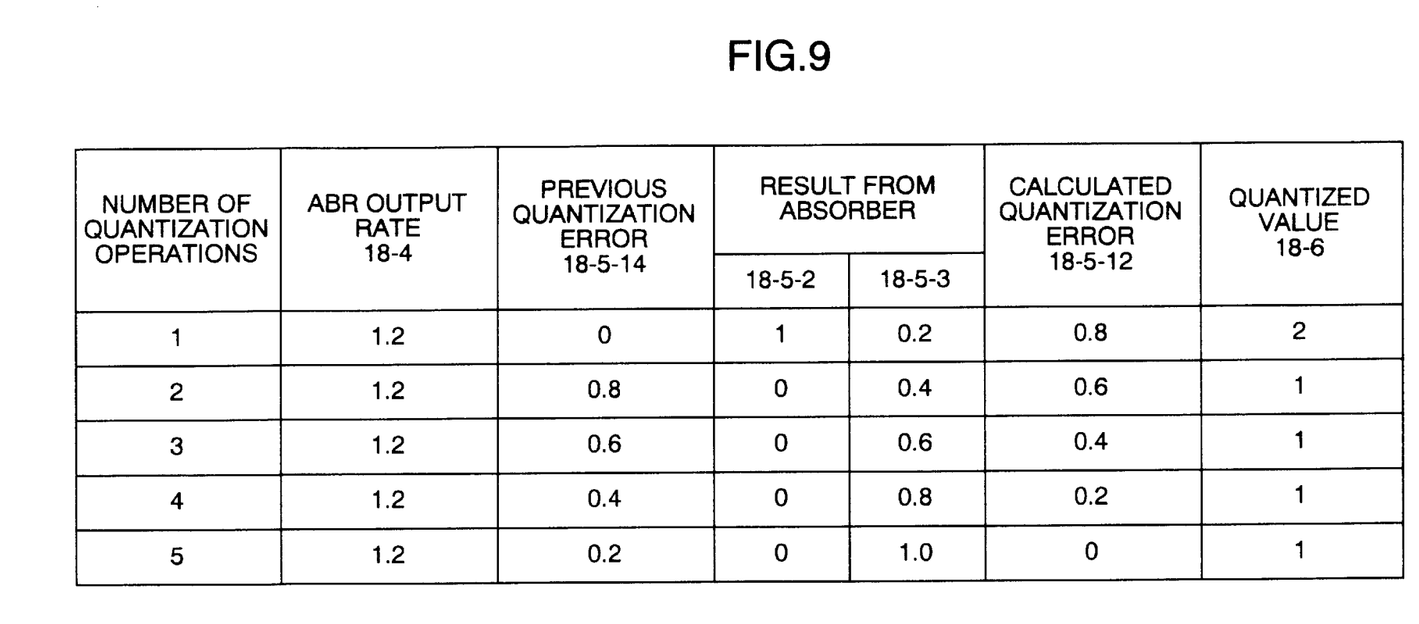
FIG. 9 is a diagram to which reference is made in explaining the construction of the quantizer circuit.
Figure 10:
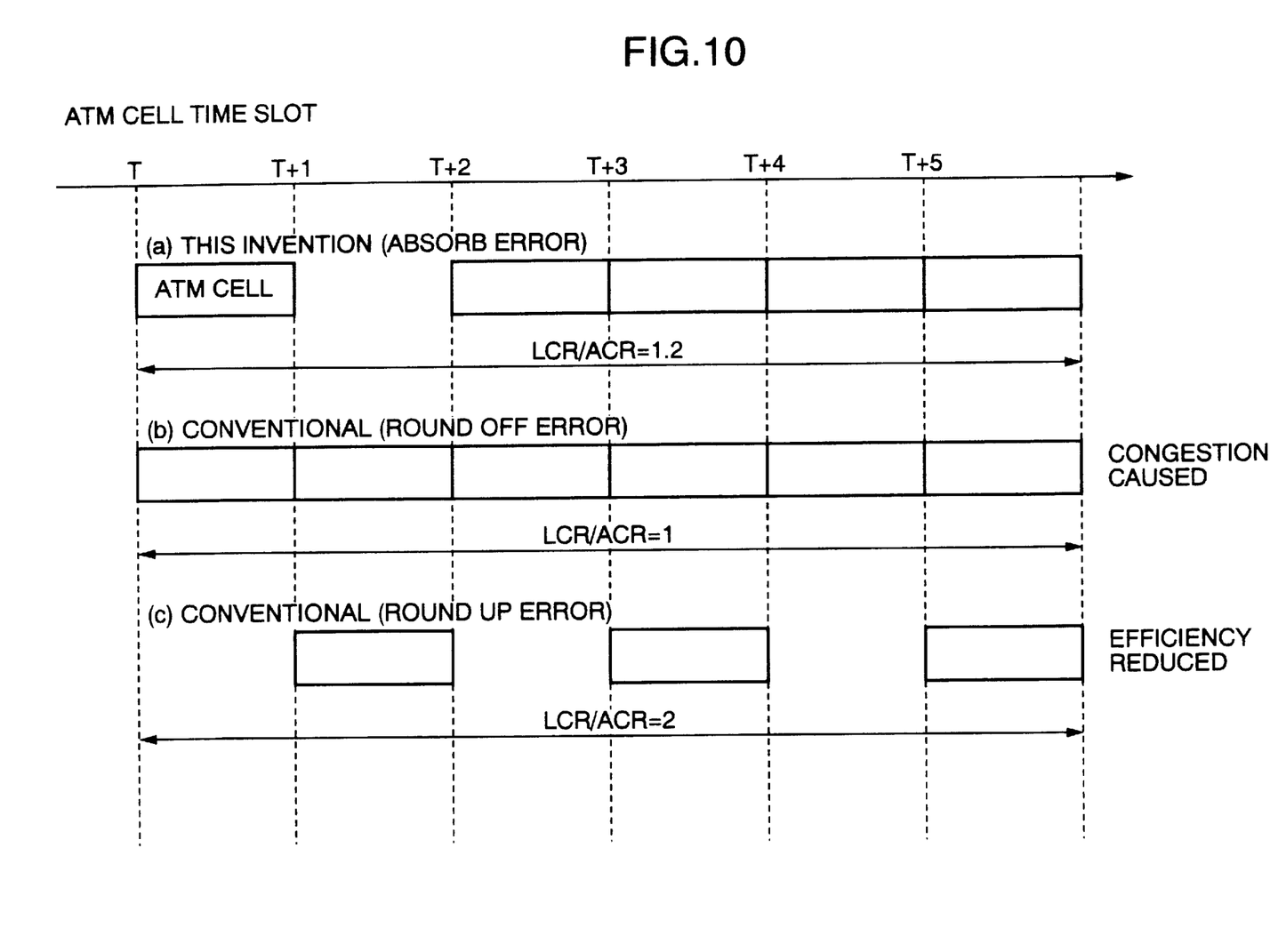
FIG. 10 is a diagram to which reference is made in explaining the operation of the cell output control apparatus.

FIG. 9 is a diagram to which reference is made in explaining the quantization operation in the quantizer circuit of the invention, and FIG. 10 is a diagram to which reference is made in explaining the state of the cell output in the case where the cell output control apparatus of the invention is used in a communication system.

When the cell output rate 18-4 (FIG. 9) to the quantizer circuit 18-5 (FIG. 4) is 1.2, the previous quantization error 18-5-14 (FIG. 9) at the first computation is the initial value, or 0. The output from the quantization error absorber circuit 18-5-1 (FIG. 8) is the integral part bit 18-5-2 (FIG. 9), or 1 and the decimal part bit 18-5-3 (FIG. 9), or 0.2. The quantization error calculated value 18-5-9 (FIG. 8) is the subtraction of 0.2 from 1, or 0.8. The quantized value 18-6 (FIGS. 8 and 9) is "2". Therefore, as illustrated in FIG. 10 at (a), the next cell is produced two cell time slots after. Those values at and after the second computation are as illustrated in FIG. 9, and from the figure it will be seen that the error can be absorbed up at the fifth quantization. The quantized value 18-6 at the second to fifth computations is "1", and a cell is produced at each cell time slot as shown in FIG. 10.

That is, according to the cell output control apparatus of the invention, since five cells are transmitted on five slots of six cell time slots with the cell transmission intervals changed in accordance with the quantization error, the ABR services can be realized in which the cell transmission can be made at a transfer rate near the actual value of ACR even when the LCR/ACR ratio is not just an integral number. The effect of the cell output control/quantization processing in this invention will be described with reference to FIG. 10. If the quantization error is not absorbed, it is possible to round-off or round-up the error. When the error is rounded off as shown in FIG. 10 at (b), the LCR/ACR ratios at and after the first computation are all "1", and thus a cell is transmitted on each cell time slot, in which case congestion occurs. When the error is rounded up as shown in FIG. 10 at (c), the LCR/ACR ratios are "2", and thus a cell is transmitted only on each second slot. Therefore, the actual LCR/ACR ratio, or "1.2" is not reflected on the cell output, with the result that the cell transmission efficiency is reduced. The cell output control of the invention, however, is able to absorb the quantization error and transmit cells at LCR/ACR=1.2 in the interval of the cell time slots, T to T+5. In other words, the actual value of ACR can be reflected on the cell transmission.

What is claimed is:

1. A cell output control apparatus of a communication system of each of a plurality of nodes that constitute a communications network and that communicate with each other in an asynchronous transfer mode, said cell output control apparatus being arranged to control transmission of cells by calculating an allowed transmission cell rate based on traffic information of said allowed transmission cell rate received in a transmission-side node from a receiving-side node, of said nodes, when said cells are transmitted and received between said transmission-side node and said receiving-side node, said cell output control apparatus comprising:

a cell time slot allotting unit which quantizes the ratio between said allowed transmission cell rate and a transmission rate between said transmission-side node and said receiving-side node into an integral value, calculates the cell output intervals based on the quantization error produced by said quantization and said integral value, and allots said cells to any ones of a plurality of cell time slots with the cell transmission intervals changed according to said quantization and said integral; value; and a cell output unit which transmits said cells through said communications network in accordance with said cell transmission intervals.

2. A cell output control apparatus of a communication system of each of a plurality of nodes that constitute a communications network and that communicate with each other in an asynchronous transfer mode, said cell output control apparatus being arranged to control transmission of cells by calculating an allowed transmission cell rate based on traffic information of said allowed transmission cell rate received in a transmission-side node from a receiving-side node, of said nodes, when said cells are transmitted and received between said transmission-side node and said receiving-side node, said cell output control apparatus comprising:

a first calculator which calculates the ratio between said allowed transmission cell rate and a transmission rate between said transmission-side node and said receiving-side node;

a quantizer which quantizes the output from said first calculator into an internal value and decides the output intervals of said cells to be transmitted on cell time slots based on the quantization error produced by said quantization and said integral value;

a counter which counts the value of said cell time slot;

a second calculator which calculates said cell time slots for said cells based on the outputs from said quantizer and said counter; and a cell time slot allotment deciding circuit which allots said cells to any ones of a plurality of cell time slots with the cell transmission intervals changed.

3. A cell output control apparatus according to claim 2, wherein said cell time slot allotment deciding circuit includes a first holder circuit which holds said allowed transmission cell rate and a second holder circuit which holds the output from said second calculator.

4. A cell output control apparatus according to claim 2, further comprising a cell output decision circuit which has virtual channels and generates one of said cells with the cell output interval changed, on each of said virtual channels.

5. A cell output control apparatus according to claim 2, wherein said first calculator is formed of a table and a bit shift circuit, and produces the ratio between said allowed transmission cell rate and said transmission rate when said allowed transmission cell rate is received by said table and when the output from said table is shifted in bits by said bit shift circuit.

6. A cell output control apparatus according to claim 2, wherein each of said allowed transmission cell rate and said transmission rate is formed of an exponential part and a mantissa part, and said first calculator includes a table which receives said mantissa part of said allowed transmission cell rate and which produces a preset value corresponding to the mantissa part of said transmission rate and the exponential part of said transmission rate, an arithmetic circuit which calculates the difference between the exponential parts of said allowed transmission cell rate and said transmission rate, and a shift circuit which performs bit-shifting of the value corresponding to the mantissa part of said transmission rate from said table by said difference from said arithmetic circuit, and produces the ratio between said allowed transmission cell rate and said transmission rate.

7. A cell output control apparatus according to claim 2, wherein said quantizer includes a decision circuit which decides the distance between the cell time slots for cells based on said integral value and said quantization error, and a calculator and quantization error holder circuit which estimates the remainder of said quantization error and feeds it back to said decision circuit at the same time as the decision of said cell output interval.

8. A cell output control apparatus according to claim 7, wherein said decision circuit includes a quantization error absorber circuit which estimates the difference between the output from said first calculator and said quantization error, a quantization error detector circuit which detects the decimal part of the output from said quantization error absorber circuit, and a selector which selects the integral part of the output from said quantization error absorber circuit or the sum of 1 and said integral part as said cell time slot interval in response to the output from said quantization error detector circuit.

9. A cell output control method in a communication system of each of a plurality of nodes that constitute a communications network and that communicate with each other in an asynchronous transfer mode, said cell output control method being used to control transmission of cells by calculating an allowed transmission cell rate based on traffic information of said allowed transmission cell rate received in a transmission-side node from a receiving-side node of said nodes, when said cells are transmitted and received between said transmission-side node and said receiving-side node, said cell output control method comprising the steps of:

calculating a ratio between said allowed transmission cell rate and a rate of transmission between said transmission-side node and said receiving-side node;

quantizing said calculated result into an integral value;

deciding a cell output interval based on the value of quantization error produced by said quantization and said integral value;

allotting, cells to be transmitted, to any ones of a plurality of cell time slots with the cell transmission intervals changed according to the decided cell output intervals; and     transmitting said cells with the cell output intervals changed in accordance with said allowed transmission cell rate.

10. A communication system as each of a plurality of communication systems which constitute communications networks and which communicate with each other in an asynchronous transfer mode, said communication system being arranged to control transmission of cells by calculating an allowed transmission cell rate based on traffic information of said allowed transmission cell rate received in a transmission-side communication system from a receiving-side communication system, said communication system comprising:

a plurality of first interface circuits each connected to one of said communications networks as an interface for a channel;

a plurality of second interface circuits each connected to the other communications network as an interface for a channel; and     a core switch circuit connected to both said plurality of first interfaces and said plurality of second interfaces, and which allots information from, at least, one or the other of said communications networks to, at least, one of said plurality of first interfaces and said plurality of second interfaces, wherein each of said plurality of first interfaces and second interfaces comprises:

a first calculator which calculates a ratio between an allowed transmission cell rate from a transmission-side communication system and a rate of transmission between said transmission-side communication system and a receiving-side communication system,     a quantizer which quantizes an output from said first calculator into an integral value, and decides an output interval of said cells on cell time slots based on a value of quantization error produced by said quantization and said integral value,     a counter which counts values of said cell time slots,     a second calculator which calculates said cell time slots for said cells based on the outputs from said quantizer and said counter, and     a cell time slot allotment decision circuit which allots, said cells to be transmitted, to any ones of said plurality of cell time slots with the cell transmission intervals changed.

11. A communications network system constituted by a plurality of communication systems which communicate with each other in an asynchronous mode, said communication network system comprising:

a plurality of first communications networks each having a plurality of terminals with an information transmitting and receiving function;

a plurality of second communications networks each having a plurality of terminals with an information transmitting and receiving function; and     a third communications network established between said communication systems that are arranged to control the transmission of cells by calculating an allowed transmission cell rate based on information of traffic of said allowed transmission cell rate received in a transmission-side one of said terminals received from a receiving-side one of said terminals through any one of said first and second communications networks;

wherein each of said communication systems comprises:

a plurality of first interface circuits each connected to one of said plurality of first or second communication networks as an interface for a channel,     a plurality of second interface circuits each connected to said third communication network as an interface for a channel, and     a core switch circuit connected to both said plurality of first interfaces and said plurality of second interfaces and by which information from, at least, any one of said first, second and third communication networks is allotted to one of said plurality of first or second interfaces;

wherein each of said plurality of first and second interfaces comprises:

a first calculator which calculates a ratio between an allowed transmission rate from a transmission-side one of said communication systems and a rate of transmission between said transmission-side communication system and a receiving-side communication system,     a quantizer which quantizes the output from said first calculator into an integral value, and decides the output interval of said cells for cell time slots on the basis of the value of quantization error produced by said quantization and said integral value, a counter which counts the value of said cell time slots, a second calculator which calculates the cell time slots for said cells on the basis of the outputs of said quantizer and said counter, and a cell time slot allotment decision circuit which allots, said cells to be transmitted, to any ones of said plurality of cell time slots with the cell transmission intervals changed.

* * * * *